United States Patent
Elliot et al.

(10) Patent No.: US 10,631,090 B1
(45) Date of Patent: Apr. 21, 2020

(54) COMPATIBILITY CHECK IN A NETWORK OF SYNCHRONIZED SPEAKERS

(71) Applicant: BOSE CORPORATION, Framingham, MA (US)

(72) Inventors: Michael Elliot, North Grafton, MA (US); Ranjeet Thooyath Ravindran, Framingham, MA (US); Trevor Lai, Wayland, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/272,413

(22) Filed: Feb. 11, 2019

(51) Int. Cl.
    *H04R 3/12* (2006.01)
    *H04R 29/00* (2006.01)
    *H04R 27/00* (2006.01)
    *G06F 3/16* (2006.01)

(52) U.S. Cl.
    CPC ............... *H04R 3/12* (2013.01); *G06F 3/162* (2013.01); *H04R 27/00* (2013.01); *H04R 29/001* (2013.01); *H04R 29/007* (2013.01); *H04R 2227/005* (2013.01)

(58) Field of Classification Search
    None
    See application file for complete search history.

(56) References Cited

U.S. PATENT DOCUMENTS

| | | | |
|---|---|---|---|
| 6,859,538 B1* | 2/2005 | Voltz | H04R 3/04 381/101 |
| 2005/0131558 A1* | 6/2005 | Braithwaite | H04N 21/234327 700/94 |
| 2006/0009985 A1* | 1/2006 | Ko | G11B 20/10 704/500 |
| 2007/0160225 A1* | 7/2007 | Seydoux | H04W 8/005 381/79 |
| 2014/0112484 A1* | 4/2014 | Britt, Jr. | H04R 29/001 381/59 |
| 2017/0098466 A1 | 4/2017 | Elliot et al. | |

* cited by examiner

*Primary Examiner* — James K Mooney
(74) *Attorney, Agent, or Firm* — Patterson + Sheridan, LLP

(57) ABSTRACT

A method is provided for an audio output device connected to a network to perform compatibility check. The audio output device discovers another audio output device connected to the network and transmits a first message to the other audio output device for checking whether the other audio output device is compatible with the audio output device. In response to the first message, the audio output device receives a second message from the other audio output device indicating whether the other audio output device is compatible with the audio output device. The audio output device, based on the second message, determines whether the other audio output device is compatible with the audio output device.

18 Claims, 5 Drawing Sheets

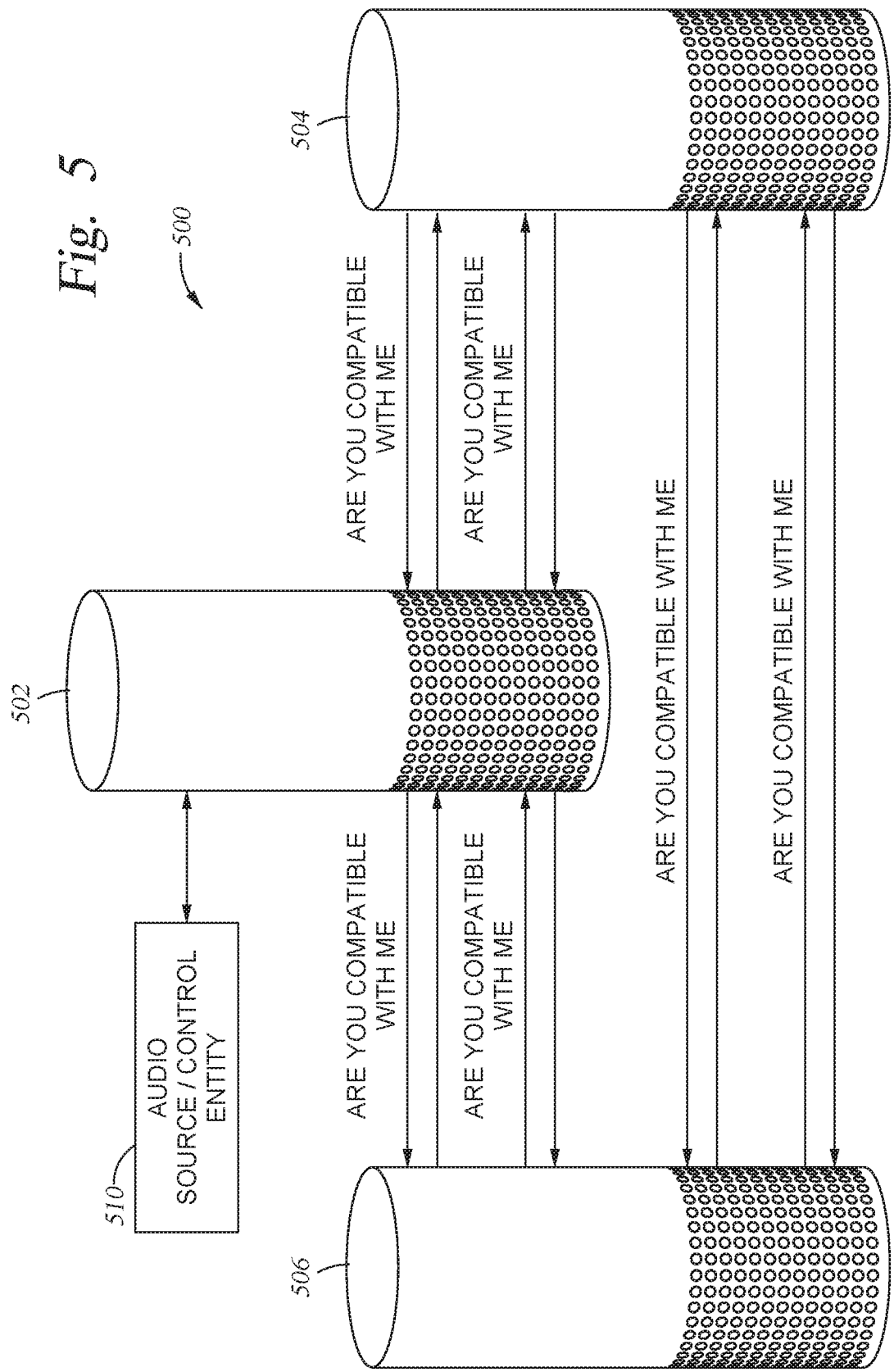

COMPATIBILITY CHECK IN A NETWORK OF SYNCHRONIZED SPEAKERS

FIELD

Aspects of the disclosure generally relate to synchronized audio output from multiple speakers, and more specifically to techniques for checking and determining compatibility between speakers of a network of synchronized speakers.

BACKGROUND

Audio output devices such as audio speakers are available in several hardware configurations and can use a range of technologies for processing and rendering audio streams and for communicating with other devices including audio input devices and other audio speakers. For example, speakers range from Bluetooth® speakers, Wi-Fi™ speakers, Audio for Video speakers (e.g., sound bars) and speakers that use other communication protocols. The wide array of speaker architectures, configurable speaker network topologies and communication technologies (e.g., Bluetooth, Wi-Fi etc.) used by the speakers to communicate with other devices makes interoperation and synchronization between speaker devices complicated and difficult to coordinate and execute.

SUMMARY

All examples and features mentioned herein can be combined in any technically possible manner.

Aspects of the present disclosure provide a method performed by an audio output device connected to a network for performing compatibility check. The method generally includes discovering another audio output device connected to the network, transmitting a first message to the other audio output device for checking whether the other audio output device is compatible with the audio output device, receiving, in response to the first message, a second message from the other audio output device indicating whether the other audio output device is compatible with the audio output device, and determining, based on the second message, whether the other audio output device is compatible with the audio output device.

In an aspect, the first message includes capabilities supported by the audio output device that correspond to at least one of media formats or protocol versions relating to transport and control of audio flow between audio output devices.

In an aspect, the second message indicates whether the other audio output device supports one or more of the capabilities supported by the audio output device that correspond to the at least one of media formats or protocol versions relating to transport and control of audio flow between audio output devices.

In an aspect, the indication comprises a one-bit flag indicating whether the other audio output device is compatible with the audio output device.

In an aspect, the method further comprises communicating, to a control entity, information regarding whether the other audio output device is compatible with the audio output device.

In an aspect, the communicating is in response to receiving a request from the control entity to form an audio group with the other audio output device.

In an aspect, in response to the information comprising an indication that the other audio output device is incompatible with the audio output device, the other audio output device receives a capabilities supported update to resolve the incompatibility.

In an aspect, the method further comprises receiving an audio stream from an audio source after determining based on the second message that the other audio output device is compatible with the audio output device; determining that the other audio output device does not support a format associated with the audio stream; and reporting an error message to a control entity indicating that the other audio output device does not support the format associated with the audio stream.

In an aspect, in response to the error message, the other audio output device receives a software update to support the format associated with the audio stream.

Aspects of the present disclosure provide an audio system. The audio system generally includes a set of two or more audio output devices configured to output synchronized audio; and a set of instructions configured to control the set of audio output devices. An audio output device in the set is generally configured to discover another audio output device in the set, transmit a first message to the other discovered audio output device in the set for checking whether the other audio output device is compatible with the audio output device, receive, in response to the first message, a second message from the other audio output device indicating whether the other audio output device is compatible with the audio output device, and determine, based on the second message, whether the other audio output device is compatible with the audio output device.

In an aspect, in response to a determined incompatibility between the other audio output device and the audio output device, the other audio output device receives a software update.

In an aspect, the first message includes capabilities supported by the audio output device that correspond to at least one of media formats or protocol versions relating to transport and control of audio flow between the audio output devices in the set.

In an aspect, the second message indicates whether the other audio output device supports one or more of the capabilities supported by the audio output device that correspond to the at least one of media formats or protocol versions relating to transport and control of audio flow between the audio output devices in the set.

In an aspect, at least one audio output device in the set is further configured to receive, from a control device, a request to form an audio group with one or more other audio devices in the set, wherein synchronized audio is to be output from the audio output devices in the audio group; and report, to the control device and in response to the request, a determined incompatibility with one or more audio output device to be included in the audio group.

In an aspect, after an audio group has been formed comprising one or more audio output devices in the set, at least one audio output device from the audio group is configured to receive an audio stream from the control device; determine that at least one other audio device does not support a format associated with the audio stream; and report an error message to the control device indicating that the at least one other audio output device does not support the format associated with the audio stream.

In an aspect, the at least one audio output device from the audio group is further configured to receive, in response to the error message, a software update for resolving incompatibility in the format; and forward the software update to the at least one other audio output device for updating software of the at least one other audio output device.

Aspects of the present disclosure provide an audio output device connected to a network for performing compatibility check. The audio output device generally includes at least one processor and a memory coupled to the at least one processor. The at least one processor is generally configured to discover another audio output device connected to the network, transmit a first message to the other audio output device for checking whether the other audio output device is compatible with the audio output device, wherein the first message includes protocol versions supported by the audio output device that correspond to transport, and control of audio flow between audio output devices; receive, in response to the first message, a second message from the other audio output device indicating whether the other audio output device is compatible with the audio output device; and determine, based on the second message, whether the other audio output device is compatible with the audio output device.

In an aspect, the second message indicates whether the other audio output device supports the protocol versions supported by the audio output device that correspond to the transport and control of audio flow between audio output devices.

In an aspect, wherein the at least one processor is further configured to receive, from a control device, a request to form an audio group with the other audio output device, wherein synchronized audio is to be output from audio output devices in the audio group; and report, to the control device and in response to the request, an indication that the other audio output device is incompatible with the audio output device.

In an aspect, the at least one processor is further configured to receive a protocol update for resolving a determined incompatibility with the other audio output device; and update at least one of the audio output device or the other audio output device based on the protocol update to resolve the incompatibility.

BRIEF DESCRIPTION OF THE DRAWINGS

FIG. 5 illustrates an example speaker system in which proactive compatibility check can be performed, in accordance with certain aspects of the present disclosure.

DETAILED DESCRIPTION

Audio output devices such as audio speakers are available in several hardware configurations and can use a range of technologies for processing and rendering audio streams and for communicating with other devices including audio input devices and other audio speakers. Example speakers include Bluetooth® speakers, Wi-Fi™ speakers, Audio for Video speakers (e.g., sound bars) and speakers that use other communication protocols. The wide array of speaker architectures, configurable speaker network topologies, software/firmware used by the speakers for transport and control of audio flow, and communication technologies (e.g., Bluetooth, Wi-Fi etc.) used by the speakers to communicate with other devices makes interoperation and synchronization between speaker devices complicated and difficult to coordinate and execute.

For example, in order for a set of speakers to interoperate as a group and output the same piece of audio in a synchronized (or near unsynchronized) manner, the speakers must be compatible with each other in terms of one or more software/firmware protocols governing transport and control of audio flow between the speakers. However, maintaining compatibility between speakers can be challenging. For example, release and update of new speaker firmware to speaker products asynchronously (e.g., individually and not as a group) and/or asynchronously from product use (e.g., overnight) creates the potential for products to have drastically different versions of firmware and therefore speaker to speaker protocol differences. Additionally or alternatively, incompatibilities can be created as new speakers are added to a system, new capabilities are added to existing speakers and/or speaker functionalities are morphed in support of speaker grouping behaviors.

Certain aspects of the present disclosure discuss techniques for checking and determining compatibility between audio output devices (e.g., speaker products) of an audio system in a consistent, well-organized and extensible manner.

Figure 1:
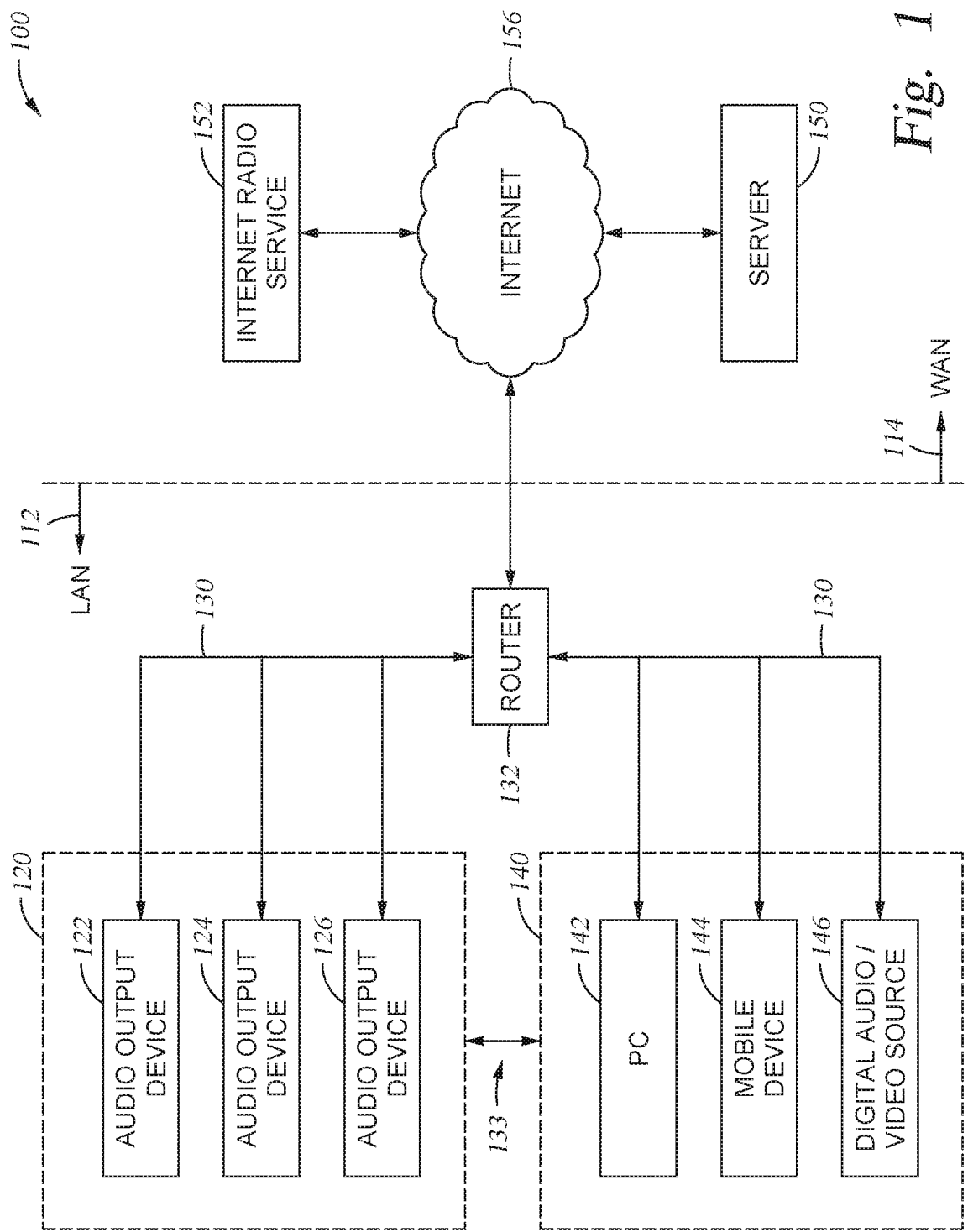
FIG. 1 illustrates an example audio distribution system in which aspects of the present disclosure can be practiced.

FIG. 1 illustrates an example audio distribution system 100 in which aspects of the present disclosure can be practiced.

Audio distribution system 100 can be used to accomplish audio synchronization between audio output devices, and includes non-limiting examples of wireless speaker packages and other wireless audio sources and sinks that can be involved in this audio synchronization. In an aspect, system 100 is adapted to deliver digital audio (e.g., digital music). As shown, system 100 includes a number of audio output devices 122, 124 and 126 which are among a group of audio output devices 120 of the system 100. In an aspect, each of the audio output devices is a wireless speaker package that is able to receive digital audio signals and convert them to analog form. The speaker packages also include an electro-acoustic transducer that receives the analog audio signals and transduces them into sound. The wireless speaker packages also include at least one processor for processing audio data. The group of audio output devices 120 can include speaker packages with different hardware architectures and audio configurations. Further, the speaker packages can support different software/firmware protocols and protocol versions thereof for transport and control of audio flows, and further can support different media file formats (e.g., mp3, mp4 etc.). Further, different speaker packages can support different wired and/or wireless communication technologies (e.g., Bluetooth, Wi-Fi, Apple Airplay®, Apple Airplay® 2 a proprietary protocol stack/suite developed by Apple Inc., with headquarters in Cupertino, Calif., that allows wireless streaming of audio, video, and photos, together with related metadata between devices, etc.) to wirelessly communicate with other speaker packages in the group as well as other devices in the system 100. In an aspect, one or more of the speaker packages can support multiple wired and/or wireless communication technologies and can be configured (e.g., by a user) to communicate using one of the supported communication technologies at one time.

System 100 further includes one or more computing devices 140 and/or one or more separate local digital audio/video source devices 146. In this example the computing devices include a personal computer 142 and a mobile computing device 144 such as a smartphone, tablet or the like. In an aspect, the computing devices 140 and the digital audio video devices 146, like the audio output devices, can support different wired and wireless communication technologies (e.g., Bluetooth, Wi-Fi, Apple Airplay®, Apple Airplay® 2 etc.) for communicating with other devices in the system 100. In an aspect, each of the computing devices 140 and the digital audio/video source devices 146 can support multiple wired and/or wireless communication technologies.

In an aspect, each device in the system 100 that is capable of Wi-Fi communication can be connected to a network 130 via a router/access point 132 and can communicate with other Wi-Fi enabled devices in the system 100 over the network 130 via the router/access point 132. In this example, as shown, the audio output devices from group 120, the computing devices 140 and the digital audio/video source devices 146 are connected to the network 130 via the router/access point 132. In this example, the network 130 is part of a wireless Local Area Network (WLAN) 112 which is connected to a wide area network (WAN) 114 by connection to Internet 156. WAN 114 includes a server 150 and an Internet radio service 152 which can both communicate with LAN 112 via the Internet 156.

In certain aspects, one or more of the computing devices 140 and the digital audio/video source device 146 can be connected to one or more of audio output devices 120 via a personal area network (PAN) 133 (e.g., a wireless PAN). PAN 133 can comprise a direct point-to-point wireless connection (e.g., using Bluetooth, Apple Airplay®, Apple Airplay® 2 or other point to point protocol) between the devices 140/146 and one or more of the audio output devices 122, 124 or 126. In an aspect, one or more of the audio output devices 120 can be capable of communicating with other audio output devices within the group via other wireless communication methods (e.g., other than Wi-Fi) including point-point Bluetooth.

In an aspect, the sources of digital audio including the computing devices 140 and the digital audio/video source device 146 provide access to content such as audio streams that are communicated over network 130 and/or network 133 to the audio output devices. The sources of such audio streams can include, for example, Internet radio stations sourced by an internet radio service such as internet radio service 152 and user defined playlists. Each of such digital audio sources maintains a repository of audio content which can be chosen by the user to be played over one or more of the audio output devices. Such digital audio sources can include Internet-based music services such as Pandora®, Spotify® and TuneIn®, for example. The digital audio/video source device 146 can include a network attached storage device. Media server applications running on the PC 142 and the mobile computing device 144 can be used to access digital content over the internet and source audio data for outputting by one or more audio output devices. Typically, the user selects the audio source and the audio output devices via PC 142 and/or mobile device 144.

In certain aspects, one or more of the computing devices 140 including the PC 142 and/or the mobile device 144 can be used as a control entity for managing creation and control of speaker groups for synchronized audio output. For example, a software application accessible via the PC 142 or the mobile device 144 can be operated by a user to create new speaker groups or manage existing speaker groups for playback of synchronized audio by the speakers in a created group of speakers.

Figure 2:
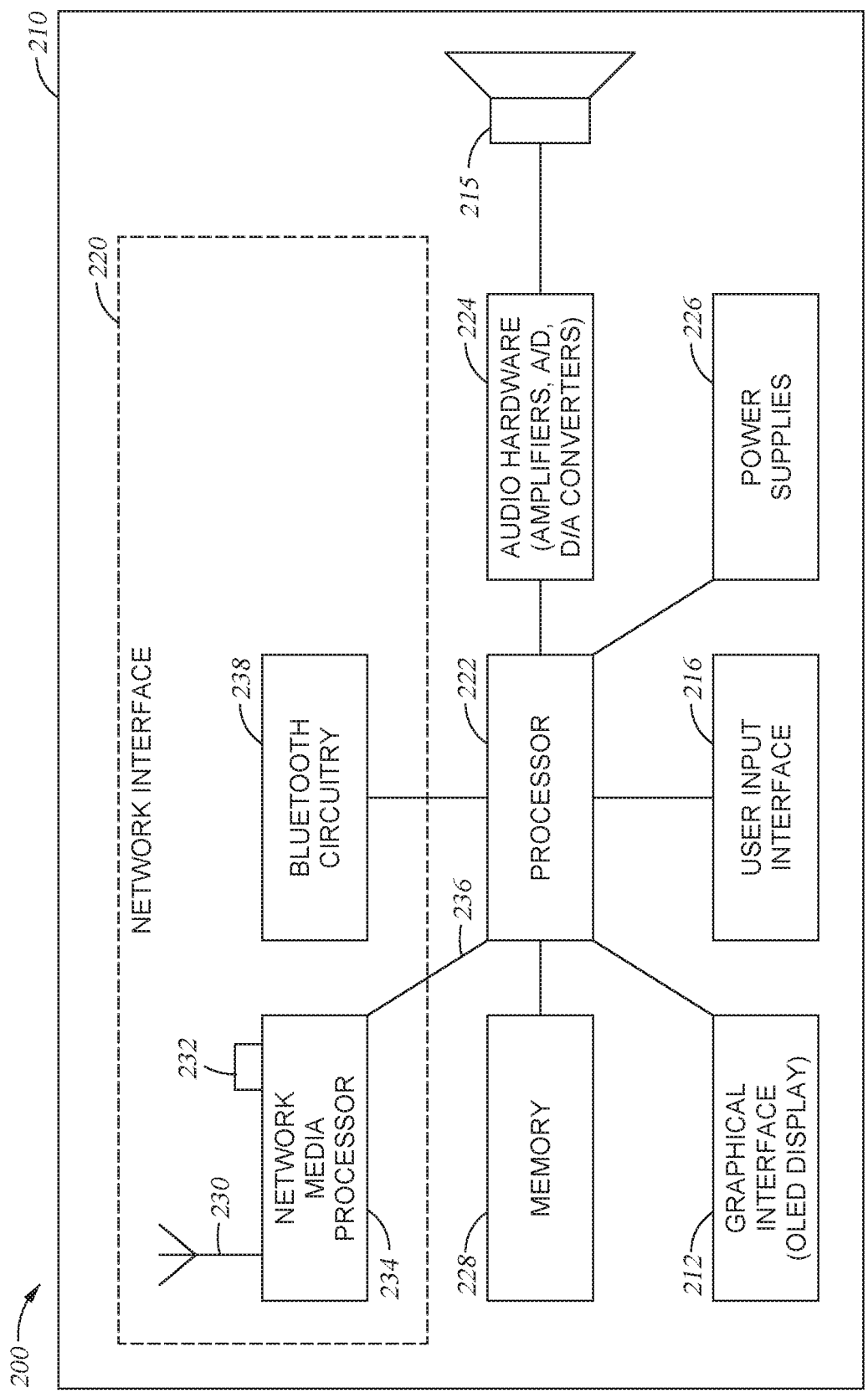
FIG. 2 illustrates an exemplary wireless speaker package, in accordance with certain aspects of the present disclosure.

FIG. 2 illustrates an exemplary wireless speaker package 200, in accordance with certain aspects of the present disclosure. As shown, the wireless speaker package 200 includes an enclosure 210. In the enclosure 210 resides an optional graphical interface 212 (e.g., an OLED display) which can provide the user with information regarding currently playing ("Now Playing") music. The speaker package 200 includes one or more electro-acoustic transducers 215 for outputting audio. Wireless speaker package device 200 also includes a user input interface 216. The user input interface 216 can include a plurality of preset indicators, which can be hardware buttons. The preset indicators can provide the user with easy, one press access to entities assigned to those buttons. The assigned entities can be associated with different ones of the digital audio sources such that a single wireless speaker package 200 can provide for single press access to various different digital audio sources.

Wireless speaker package 200 also includes a network interface 220, at least one processor 222, audio hardware 224, power supplies 226 for powering the various components of the speaker package 200, and memory 228. In an aspect, the processor 222, the graphical interface 212, the network interface 220, the audio hardware 224, the power supplies 226, and the memory 228 are interconnected using various buses, and several of the components can be mounted on a common motherboard or in other manners as appropriate.

The network interface 220 provides for communication between the wireless speaker package 200 and one or more audio sources and other networked wireless speaker packages and other audio playback devices via one or more communications protocols. The network interface 220 can provide either or both of a wireless interface 230 and a wired interface 232. The wireless interface 230 allows the wireless speaker package 200 to communicate wirelessly with other devices in accordance with a communication protocol such as IEEE 802.11. The wired interface 232 provides network interface functions via a wired (e.g., Ethernet) connection.

In certain aspects, the network interface 220 can also include a network media processor 234 for supporting Apple AirPlay® and/or Apple Airplay® 2. For example, if a user connects an AirPlay® or Apple Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Apple Airplay® 2 and/or DLNA's UPnP protocols, and all integrated within one device.

All other digital audio received as part of network packets comes straight from the network media processor 234 through a USB bridge 236 to the processor 222 and runs into the decoders, DSP, and eventually is played back (rendered) via the electro-acoustic transducer(s) 215.

The network interface 220 can also include a Bluetooth circuitry 238 for Bluetooth applications (e.g., for wireless communication with a Bluetooth enabled audio source such as a smartphone or tablet) or other Bluetooth enabled speaker packages.

Streamed data passes from the network interface 220 to the processor 222. The processor 222 can execute instructions within the wireless speaker package (e.g., for performing, among other things, digital signal processing, decoding, and equalization functions), including instructions stored in the memory 228. The processor 222 can be implemented as a chipset of chips that includes separate and multiple analog and digital processors. The processor 222 can provide, for example, for coordination of other components of the audio speaker package 200, such as control of user interfaces, applications run by the audio playback device 200 and the like.

In certain aspects, the memory 228 stores software/firmware related to protocols and versions thereof used by the speaker package 200 for communicating with other networked speakers. For example the software/firmware governs how the speaker package 200 communicates with other speakers for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory can also store various codecs supported by the speaker package for audio playback of respective media formats. In an aspect, the software/firmware stored in the memory can be accessible and executable by the processor 222 for synchronized playback of audio with other networked speaker packages.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for sound output. In addition, the audio hardware 224 can include circuitry for processing analog input signals to provide digital audio signals for sharing with other devices, for example, other speaker packages for synchronized output of the digital audio.

The memory 228 can include, for example, flash memory and/or non-volatile random access memory (NVRAM). In some implementations, instructions (e.g., software) are stored in an information carrier. The instructions, when executed by one or more processing devices (e.g., the processor 222), perform one or more processes, such as those described elsewhere herein. The instructions can also be stored by one or more storage devices, such as one or more computer or machine-readable mediums (for example, the memory 228, or memory on the processor). The instructions can include instructions for performing decoding (i.e., the software modules include the audio codecs for decoding the digital audio streams), as well as digital signal processing and equalization.

As discussed above, aspects of the present disclosure discuss techniques for checking and determining compatibility between audio output devices (e.g., speaker products) of an audio system in a consistent, well-organized and extensible manner. Certain aspects also discuss how incompatibility of speakers can be resolved.

Figure 3:
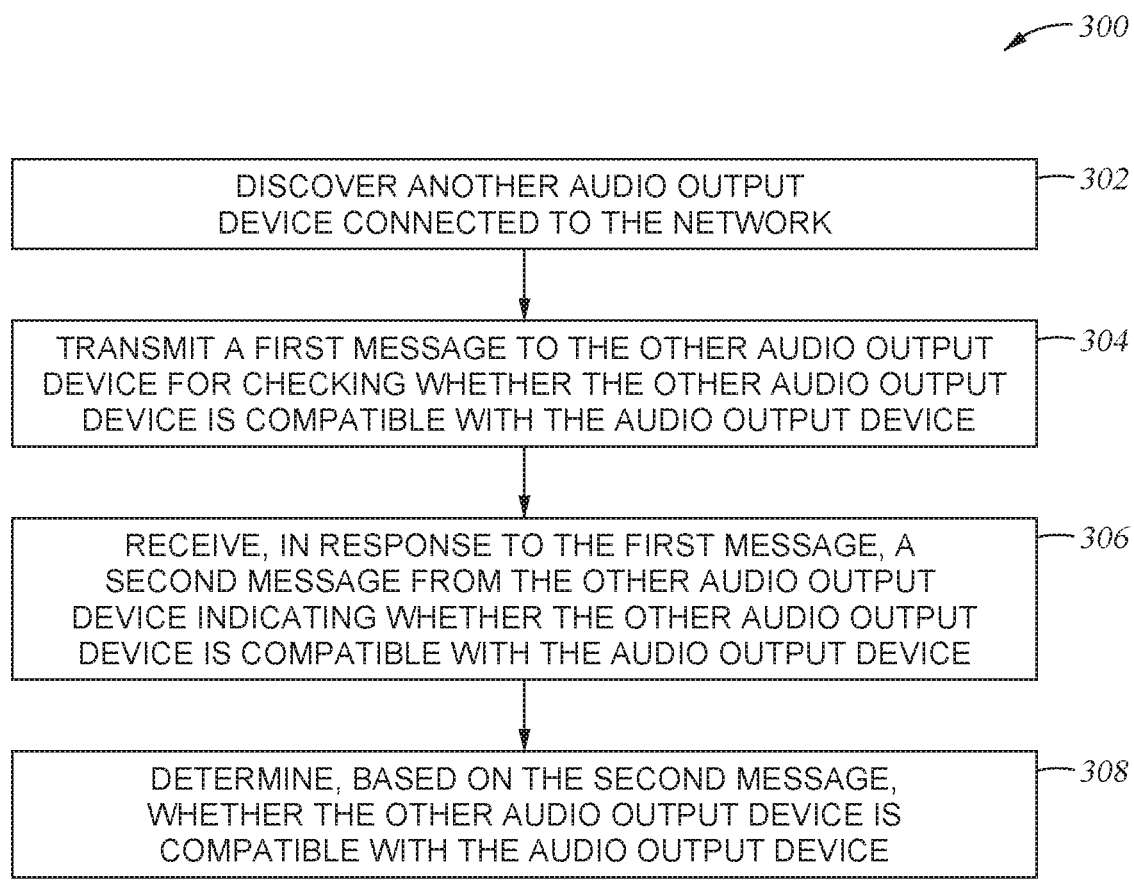
FIG. 3 illustrates example operations that can be performed by an audio output device connected to a network of an audio distribution system (e.g., System 100 of FIG. 1) for performing compatibility check, in accordance with certain aspects of the present disclosure.

FIG. 3 illustrates example operations 300 that can be performed by an audio output device connected to a network of an audio distribution system (e.g., system 100 of FIG. 1) for performing compatibility check, in accordance with certain aspects of the present disclosure. In an aspect, the audio output device includes a master speaker package configured to receive an audio stream from an audio input device (e.g., PC, mobile device, digital audio source, etc.) and distribute the audio stream to other secondary/slave speaker packages. In an aspect, the network can include a network of audio output and audio input devices as shown in FIG. 1 configured for interoperation.

Operations 300 begin at 302 in this example implementation, by discovering another audio output device connected to the network. At 304, the audio output device transmits a first message to the other audio output device for checking whether the other audio output device is compatible with the audio output device. At 306, in response to the first message, the audio output device receives a second message from the other audio output device indicating whether the other audio output device is compatible with the audio output device. At 308, the audio output device determines, based on the second message, whether the other audio output device is compatible with the audio output device.

In certain aspects, synchronized playback of an audio stream by two or more speaker packages can be accomplished using a master-slave architecture in which one speaker package serves as a master and receives and distributes to the other speaker packages a stream of audio data.

Figure 4:
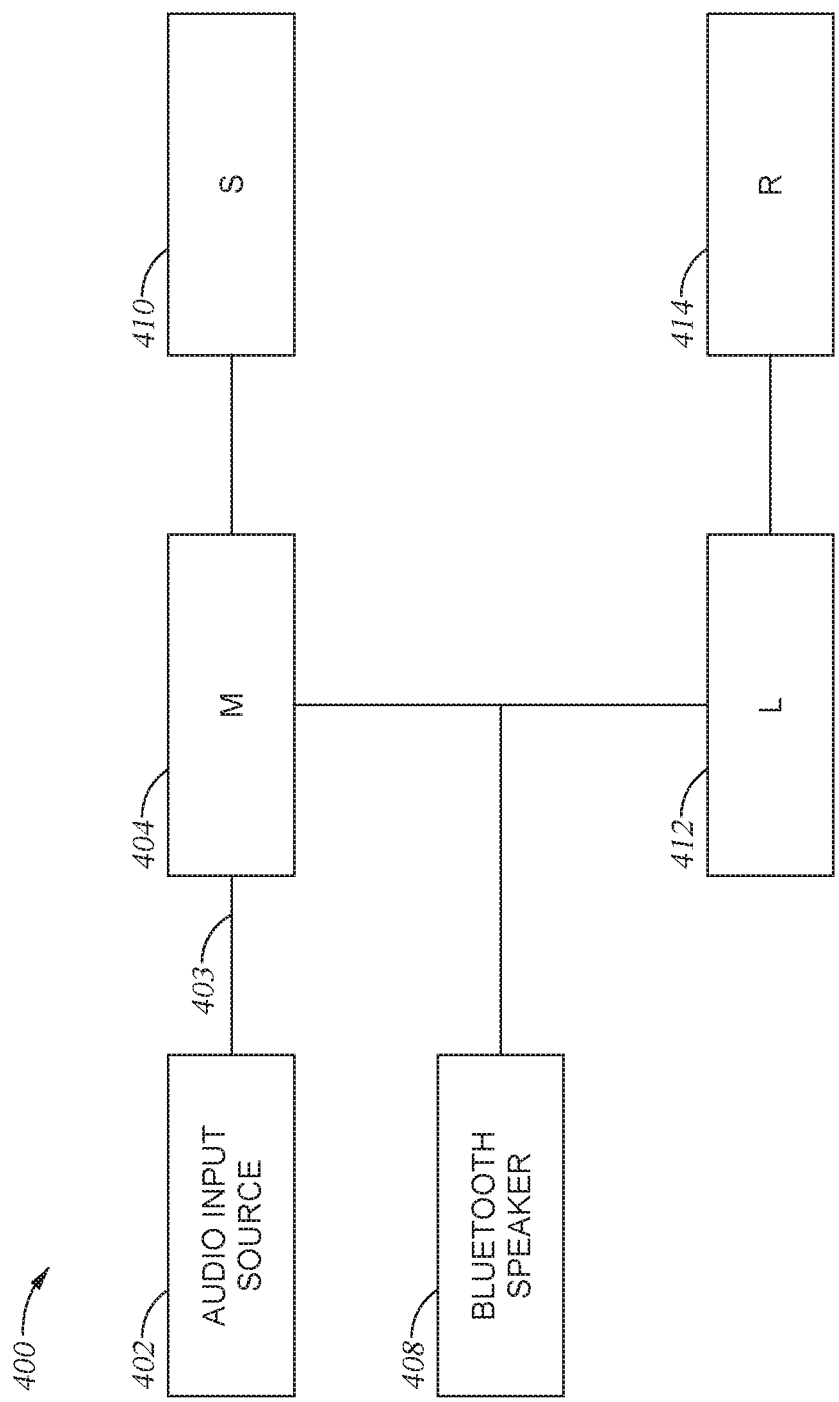
FIG. 4 illustrates an example master-slave audio system of audio output devices in which aspects of the present disclosure can be practiced.

FIG. 4 illustrates an example master-slave audio system 400 of audio output devices in which aspects of the present disclosure can be practiced. In an aspect, the audio system 400 can be a portion of the audio distribution system 100 discussed in FIG. 1.

In certain aspects, audio system 400 can be used for synchronized output of an audio stream from multiple audio output devices of the system 400. As shown, audio system 400 includes an audio input source 402 that communicates with wireless speaker package 404 over a connection 403. In an aspect, the connection 103 can be a wireless Bluetooth or Wi-Fi connection, or can use any other wired or wireless communication network protocol now known or hereafter developed. System 400 includes one or more additional wireless speaker packages, which in this example implementation includes four additional wireless speaker packages 408, 410, 412 and 414. Normally, but not necessarily, in the case where there are multiple wireless speaker packages that are part of the system 400, one wireless speaker package (wireless speaker package 404 in this case) functions as the master or primary device (designated as M in FIG. 4) and the other wireless speaker packages (408, 410, 412 and 414 in this case) function as slave or secondary devices. Master device 404 receives audio data from source 402 and distributes it to slaves 408, 410, 412 and 414. In certain aspects, such audio distribution can use any wired or wireless network protocol such as Wi-Fi via wireless access point/router 132 (as shown in FIG. 1) or point to point Bluetooth protocol. In this example, each of the wireless speaker packages 404, 408, 410, 412 and 414 is configured to play the audio. In an aspect, the audio playback among the speaker packages can be (but need not be) synchronized such that they all play the same audio at the same time. In an aspect, one or more of the speaker packages can play the audio stream at a purposeful or selected (e.g., via user configuration) phase difference compared to one or more other speaker packages.

In this example, as shown in FIG. 4, the slave speaker packages include a secondary speaker package 410 (designated by S), a left-right speaker pair including a left speaker 412 (designate by L) and a right speaker 414 (designated by R), and a Bluetooth (BT) speaker 408. In an aspect, the right speaker 414 is secondary to the left speaker 412 in the left-right speaker pair, such that the right speaker 414 is controlled by the left speaker 412. In this example, the slave speakers 410, 412 and 414 communicate with the master speaker 404 via Wi-Fi technology while the BT speaker 408 communicates with the master speaker 404 using Bluetooth technology. It can be noted that that such connections could operate using one or more other wireless protocols or technologies, and in some implementations, one or more speakers directly or indirectly connected to master 404 include a wired connection to at least one other speaker in the system 400.

In an example configuration, the master speaker package 404 includes a sound bar device receiving an audio stream from an audio source and outputting audio that lip-syncs with video played on a video output device (not shown). In such an example configuration, the secondary speaker 410 could include a surround speaker and/or a base speaker in the same room as the master speaker 404, such as for surround sound system. Further, in such an example configuration, the BT speaker 408 could include a pair of Bluetooth headphones that connect to the master speaker and enable a user to listen to the audio stream at a different volume. Further, in such an example configuration, the left-right speaker pair 412 and 414 can be out-of-room speakers placed, for example, in another room or in an outdoor area of a house.

The slave devices 408, 410, 412 and 414 can be synched to the master 404 using a clock synchronization algorithm that keeps the current clock time on all of the slave devices synchronized with that of the master device 404. The devices all have clocks that are synched to a common reference clock. In an aspect, the clock synchronization algorithm is separate and aside from the audio stream. For example, in an implementation, master 404 manages the audio stream, whereas another speaker (such as 412) manages the clock synchronization algorithm. Clock data related to the clock synchronization algorithm can be provided by the master to the slaves periodically (e.g., every few seconds) to keep the slave devices updated and in sync with the master.

Additionally or alternatively, in an example implementation of system 400, the audio input source 402 includes a control entity that controls configuration and management of speaker groups for synchronized audio output by speakers in a configured group of speakers. In certain aspects, audio input source 402 can be a PC 142 or a mobile device 144 (as shown in FIG. 1) and the control entity can be a software application installed on the PC 142 or the mobile device 144 accessible to the user via a user interface. In an aspect, using the control entity via the user interface, the user can create and configure new speaker groups, or can manipulate existing speaker groups by adding new speakers or dropping one or more speakers. The control entity can also be configured to (automatically or upon user input) obtain compatibility information of particular speakers and send software/firmware updates to the speakers to resolve any detected incompatibilities.

In certain aspects, one or more types of compatibility checks can be defined, including a proactive compatibility check and a reactive compatibility check, to provide some examples.

In certain aspects, the proactive compatibility check includes determining compatibility of speakers connected to the same network for synchronized playback of an audio stream, before two or more of the networked speakers are configured (e.g., by the control entity) as a group of speakers for synchronized audio playback. In an aspect, the proactive compatibility check only checks compatibility between the networked speakers of lower level frame protocols including, for example, protocols related to control and audio paths discussed above.

In certain aspects, the reactive compatibility check includes determining compatibility of speakers in a configured group of speakers for the synchronized playback. In an aspect, the reactive compatibility check includes checking compatibility between speakers of a configured group for one or more media file formats (e.g., audio codecs) related to playback of audio content by the speakers, which is not ultimately known until a speaker or group is actively playing a selected media file.

In certain aspects, as part of the proactive compatibility check, a network speaker checks if one or more other speakers connected to the same network are compatible for synchronized playback of audio content. In an aspect, this includes a first networked speaker sending a message to a second networked speaker for checking whether the second speaker is compatible with the first speaker. In an aspect, the first message includes capabilities of the first speaker. For example, the capabilities can correspond to media formats supported by the first speaker and/or protocol versions of control path and audio path protocols supported by the first speaker. In an aspect, the second speaker, in response to receiving the first message, determines if the capabilities supported included in the first message are compatible with corresponding capabilities supported by the second speaker. In an aspect, in order to determine the compatibility, the second speaker compares each media format received in the first message with the media formats supported by the second speaker. In an aspect, the second speaker determines that one or more media formats received in the first message is compatible if the second speaker supports the same one or more media formats, or supports a compatible newer or older media format. In an aspect, the second speaker determines if it is compatible with the first speaker based on the determined compatibility of individual media formats. In an aspect, the second speaker determines that it is compatible with the first speaker only if it has corresponding compatible media format support for each media format received in the first message. In an aspect, the second speaker determines that it is compatible with the first speaker even if it only supports a subset (less than the total) of corresponding compatible media formats for media formats received in the first message (e.g., one or more commonly utilized media formats).

In an aspect, in order to determine the compatibility, the second speaker compares each protocol version received in the first message with a corresponding protocol (if any) supported by the second speaker. In an aspect, the second speaker determines that a particular control path or audio path protocol version received in the first message is compatible if the second speaker supports the same protocol version, or supports a compatible newer or older protocol version. In an aspect, the second speaker determines if it is compatible with the first speaker based on the determined compatibility of individual protocol versions. In an aspect, the second speaker determines that it is compatible with the first speaker only if it has corresponding compatible protocol versions for each protocol version received in the first message. In an aspect, the second speaker determines that it is compatible with the first speaker even if it only supports a subset (less than the total) of corresponding compatible protocol versions for protocol versions received in the first message (e.g., one or more commonly utilized protocol versions). In some implementations, compatibility of support for both media formats and protocol versions for transport and control of audio flow between audio output devices are determined using the techniques variously described herein. In this manner compatibility across versions of software can be maximized leaving the coverage of compatibility between versions flexible.

In certain aspects, the second speaker, based on its determination of compatibility, sends an indication to the first speaker of whether the second speaker is compatible with the first speaker. In an aspect, the indication is as simple as a one-bit flag indicating whether or not the second speaker is compatible with the first speaker. In some aspects, the second speaker only sends data to the first speaker, the data allowing the first speaker to make a determination regarding compatibility. Additionally, or alternatively, the second speaker sends a list of protocol versions supported by the second speaker, in some aspects. In some such aspects, the list of protocol versions supported can either be a total list or a list that corresponds to the protocol versions supported by the first speaker.

In certain aspects, in the master-slave configuration of system 400 the first speaker can be any one of the speakers 404, 408, 410, 412 and 414 (including master and slave speakers), and the second speaker can be any one of the remaining speakers.

In certain aspects, the proactive compatibility check can be triggered by a number of events. In an aspect, the proactive compatibility check is triggered when the system (e.g., system 100, 400) is powered up. In an aspect, when the system is powered up, each speaker in the system performs compatibility check with each other speaker in the system. In an aspect, the proactive compatibility check is triggered based on a predefined time period (e.g., once every night at a default or user-specified time). In an aspect, the proactive compatibility check is triggered when a speaker within the system (e.g., system 100, 400) is added to the system. In an aspect, the proactive compatibility check is triggered when a speaker within the system (e.g., system 100, 400) is removed from the system. In an aspect, the proactive compatibility check is performed after a speaker within the system (e.g., system 100, 400) is updated (e.g., via installation of a software/firmware update) or upgraded (e.g., via installation of a hardware upgrade). In an aspect, the proactive compatibility check is triggered manually, such as by a user selecting an option to perform the check. In an aspect, the proactive compatibility check is triggered randomly. In some implementations, any or all of the described triggers can be used to perform the proactive compatibility check.

FIG. 5 illustrates an example speaker system 500 in which proactive compatibility check can be performed, in accordance with certain aspects of the present disclosure. System 500 includes a primary/master speaker 502 and secondary/slave speakers 504 and 506. In an aspect, each of the speakers is connected to each other speaker via a wired or wireless connection. The master speaker 502 is further connected (wired or wirelessly) to an audio source device 510 including a control entity 510 for managing speaker groupings and, in some aspects, other functionality. In certain aspects, as the system 500 is powered up, each speaker in the system discovers the presence of each other speaker, for example, connected to the same network. This can occur, for example, one speaker at a time or all at once. Additional or alternative triggers can cause the proactive compatibility check to occur (e.g., as previously described herein). Once the speakers have discovered other speakers, as part of the proactive compatibility check, each of the speakers 502, 504 and 506 transmits a first message to each other speaker to check compatibility with the other speakers.

Each other speaker, in response to receiving the first message, transmits back a second message including an indication of compatibility. The first message can include protocol versions related to control path and audio path protocols (e.g., as previously described herein). In some implementations, the second message includes an indicator (e.g., a one-bit flag) indicating whether target speaker receiving the first message is compatible with the source speaker transmitting the first message.

In certain aspects, each speaker, upon completing the proactive compatibility check, transmits the respective compatibility information to the master speaker 502. In an aspect, the compatibility information includes information regarding whether each speaker is compatible with each other speaker. For example, compatibility information transmitted by speaker 504 includes information regarding whether speaker 504 is compatible with speakers 502 and 506. Similarly, compatibility information transmitted by speaker 506 includes information regarding whether speaker 506 is compatible with speakers 502 and 504. The master speaker maintains a list of the speaker compatibilities and provides the compatibility information to the control entity as needed, in some implementations. In other implementations, the control entity (e.g., a cloud-based database) maintains the list of speaker compatibilities and provides the compatibility information to the speakers as needed.

In certain aspects, the proactive compatibility check as shown in FIG. 5 can be triggered when software/firmware of one or more of the speakers is updated. Additionally or alternatively, the proactive compatibility check can be triggered periodically, at configured times, or user triggered.

In certain aspects, once the speakers are powered up and the proactive compatibility has been completed by a speaker system, the master speaker is ready to receive a request to create a new audio group of speakers for synchronized audio output. For example, with reference to FIG. 4, the master speaker 404 can receive a request from the control entity to create an audio group including speakers 404, 410 and 408. In response to receiving the request, the master speaker 404 can check the compatibility between the speakers 404, 410 and 408, for example, based on the compatibility information locally stored at the master speaker 404. If the master speaker determines that all speakers 404, 410 and 408 are compatible with each other, the master speaker 404 creates the audio group. In an aspect, if the master speaker 404 determines that any one or more of the speakers 404, 410 or 408 is incompatible with any of the other speakers, the master speaker generates and transmits an error message back to the control entity. In an aspect, the error message includes specific information regarding the incompatibility. For example, the error message includes an identity of each speaker that is incompatible. Additionally or alternatively, the error message can include information regarding one or more protocol versions of the incompatible speaker. In an aspect, the control entity, upon receiving the error message, can obtain an appropriate software/firmware update for the incompatible speaker and send the update to the incompatible speaker. In an aspect, the control entity sends the software/firmware update to the master speaker and the master speaker forwards the update to the respective incompatible slave or secondary speaker. In another aspect, the control entity sends the software/firmware update directly to the incompatible slave or secondary speaker. In an aspect, the software/firmware updates include protocol version updates that can resolve the incompatibility.

In certain aspects, once the proactive compatibility check is completed and a set of speakers are found compatible with each other, two or more speakers from the set can be allowed to create an audio group for synchronized playback of audio.

In certain aspects, the reactive compatibility check can be performed after an audio group is successfully established. In an aspect, once an audio group of speakers is successfully established, the speakers are ready to receive requests to play audio streams. For example, a user can select an audio track for playing on the configured group of speakers using the interface of the control entity. An audio stream corresponding to the selected audio track is sent to each speaker in the audio group. In an aspect, if the speakers are in a master-slave configuration, the control entity sends the audio stream to the master speaker and the master speaker forwards the audio stream to the slave speakers. At this point, each of the speakers that receive the playback request perform a reactive compatibility check, in some implementations. For example, in an aspect, the reactive compatibility check includes checking if a particular speaker supports a media file format associated with the audio stream. In an aspect, if a speaker from the group of speakers determines that it does not support the media file format necessary for playing back the requested audio stream, the speaker generates an error message and transmits the error message to the control entity. In an aspect, if the incompatible speaker is a secondary speaker, the speaker can send the error message to the master speaker for forwarding to the control entity or the speaker sends the error message directly to the control entity. In an aspect, the control entity, upon receiving the error message, can obtain an appropriate software/firmware update for the incompatible speaker and send the update to the incompatible speaker. In an aspect, the control entity sends the software/firmware update to the master speaker and the master speaker forwards the update to the respective incompatible slave or secondary speaker. In another aspect, the control entity sends the software/firmware update directly to the incompatible slave or secondary speaker. In an aspect, the incompatible slave or secondary speaker, upon detecting the incompatibility, checks a cloud service for software/firmware update and can receive the software/firmware update from the cloud service.

In certain aspects, every time a speaker completes updating its software/firmware (e.g., based on proactive or reactive compatibility checks), the updated speaker or the entire system reboots. In some such aspects, after the reboot, the system performs at least one of the proactive or reactive compatibility checks.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method performed by an audio output device connected to a network for performing compatibility check, comprising:
   discovering another audio output device connected to the network;
   transmitting a first message to the other audio output device for checking whether the other audio output device is compatible with the audio output device, wherein the first message comprises at least one of i) media formats supported by the audio output device or ii) protocol versions supported by the audio output device that relate to transport and control of audio flow between audio output devices;
   receiving, in response to the first message, a second message from the other audio output device indicating whether the other audio output device is compatible with the audio output device; and
   determining, based on the second message, whether the other audio output device is compatible with the audio output device.

2. The method of claim 1, wherein the second message indicates whether the other audio output device supports at least one of:
   the media formats supported by the audio output device; or
   the protocol versions supported by the audio output device.

3. The method of claim 2, wherein the indication comprises a one-bit flag indicating whether the other audio output device is compatible with the audio output device.

4. The method of claim 1, further comprising:
communicating, to a control entity, information regarding whether the other audio output device is compatible with the audio output device.

5. The method of claim 4, wherein the communicating is in response to receiving a request from the control entity to form an audio group with the other audio output device.

6. The method of claim 4, wherein, in response to the information comprising an indication that the other audio output device is incompatible with the audio output device, the other audio output device receives a capabilities supported update to resolve the incompatibility.

7. The method of claim 1, further comprising:
receiving an audio stream from an audio source after determining based on the second message that the other audio output device is compatible with the audio output device;
determining that the other audio output device does not support a format associated with the audio stream; and
reporting an error message to a control entity indicating that the other audio output device does not support the format associated with the audio stream.

8. The method of claim 7, wherein, in response to the error message, the other audio output device receives a software update to support the format associated with the audio stream.

9. An audio system comprising:
a set of two or more audio output devices configured to output synchronized audio; and
a set of instructions configured to control the set of audio output devices,
wherein an audio output device in the set is configured to:
discover another audio output device in the set;
transmit a first message to the other discovered audio output device in the set for checking whether the other audio output device is compatible with the audio output device, wherein the first message comprises at least one of i) media formats supported by the audio output device or ii) protocol versions supported by the audio output device that relate to transport and control of audio flow between audio output devices;
receive, in response to the first message, a second message from the other audio output device indicating whether the other audio output device is compatible with the audio output device; and
determine, based on the second message, whether the other audio output device is compatible with the audio output device.

10. The audio system of claim 9, wherein, in response to a determined incompatibility between the other audio output device and the audio output device, the other audio output device receives a software update.

11. The audio system of claim 9, wherein the second message indicates whether the other audio output device supports at least one of:
the media formats supported by the audio output device; or
the protocol versions supported by the audio output device.

12. The audio system of claim 9, wherein at least one audio output device in the set is further configured to:
receive, from a control device, a request to form an audio group with one or more other audio devices in the set, wherein synchronized audio is to be output from the audio output devices in the audio group; and
report, to the control device and in response to the request, a determined incompatibility with one or more audio output device to be included in the audio group.

13. The audio system of claim 12, wherein, after an audio group has been formed comprising one or more audio output devices in the set, at least one audio output device from the audio group is configured to:
receive an audio stream from the control device;
determine that at least one other audio device does not support a format associated with the audio stream; and
report an error message to the control device indicating that the at least one other audio output device does not support the format associated with the audio stream.

14. The method of claim 13, wherein the at least one audio output device from the audio group is further configured to:
receive, in response to the error message, a software update for resolving incompatibility in the format; and
forward the software update to the at least one other audio output device for updating software of the at least one other audio output device.

15. An audio output device connected to a network for performing compatibility check, comprising:
at least one processor configured to:
discover another audio output device connected to the network;
transmit a first message to the other audio output device for checking whether the other audio output device is compatible with the audio output device, wherein the first message comprises protocol versions supported by the audio output device that relate to transport and control of audio flow between audio output devices;
receive, in response to the first message, a second message from the other audio output device indicating whether the other audio output device is compatible with the audio output device; and
determine, based on the second message, whether the other audio output device is compatible with the audio output device; and
a memory coupled to the at least one processor.

16. The audio output device of claim 15, wherein the second message indicates whether the other audio output device supports the protocol versions supported by the audio output device that correspond to the transport and control of audio flow between audio output devices.

17. The audio output device of claim 15, wherein the at least one processor is further configured to:
receive, from a control device, a request to form an audio group with the other audio output device, wherein synchronized audio is to be output from audio output devices in the audio group; and
report, to the control device and in response to the request, an indication that the other audio output device is incompatible with the audio output device.

18. The audio output device of claim 15, wherein the at least one processor is further configured to:
receive a protocol update for resolving a determined incompatibility with the other audio output device; and
update at least one of the audio output device or the other audio output device based on the protocol update to resolve the incompatibility.

* * * * *